United States Patent [19]

McCrickerd

[11] 4,061,995

[45] Dec. 6, 1977

[54] ODOGRAPH AND HEADING INDICATOR THEREFOR

[76] Inventor: John T. McCrickerd, 1857 Elba Circle, Costa Mesa, Calif. 92626

[21] Appl. No.: 543,391

[22] Filed: Jan. 23, 1975

[51] Int. Cl.² .......................................... G08G 1/12
[52] U.S. Cl. ................................ 340/24; 33/363 K; 33/DIG. 3; 250/231 R; 364/450
[58] Field of Search ............. 340/23, 24; 116/114 W, 116/124 R, 114 K, 124 G; 33/360, 363 R, 363 K, DIG. 3, 356; 343/112 R, 112 CA, 112 PT; 250/231 R, 231 SE, 231 GY; 235/150.27

[56] References Cited

U.S. PATENT DOCUMENTS

| | | | |
|---|---|---|---|
| 2,364,908 | 12/1944 | Miller | 33/222 |
| 2,447,344 | 8/1948 | Kliever | 33/363 K |
| 2,484,790 | 11/1949 | Hartig | 33/363 K |
| 2,533,029 | 12/1950 | McNish et al. | 346/108 |
| 2,609,513 | 9/1952 | Boucher et al. | 33/363 K |
| 3,249,914 | 5/1966 | Smart | 343/112 PT |
| 3,303,347 | 2/1967 | Wingate | 250/231 SE |
| 3,480,788 | 11/1969 | Barbieri et al. | 250/237 |
| 3,789,198 | 1/1974 | Henson et al. | 340/24 |

OTHER PUBLICATIONS

Riter et al., Speeding the Deployment of Emergency Vehicles, IEEE Spectrum, Dec. 1973, pp. 56—62.
Collen, Vehicle Navigation—The State of the Art, British Communications and Electronics, Aug. 1965, pp. 486-489.
Spracklan, Land Vehicle Navigation System, Industrial Electronics, Feb. 1965, pp. 72-76.
Myer, VEPOL—A Vehicular Planimetric Dead-Reckoning Computer, IEEE Transactions of Vehicular Technology Aug. 1971, pp. 62–68.
Rosen et al., An Electronic Route . . . Highway Vehicles, IEEE Transactions on Vehicular Technology, Feb. 1970, pp. 143-152.
Scales, Letter to Forum, IEEE Spectrum, Mar. 1974, p. 30.
Howe, The Feasibility of . . . Vehicle Location, Navigation: Journal of the Institute of Navigation, Spring 1974, pp. 9-15.
Hoff, Improved Position . . . Navigation System, Navigation: Journal of the Institute of Navigation, Summer 1971, pp. 247-252.

*Primary Examiner*—John W. Caldwell, Sr.
*Assistant Examiner*—James J. Groody
*Attorney, Agent, or Firm*—Nilsson, Robbins, Dalgarn, Berliner, Carson & Wurst

[57] ABSTRACT

An odograph in which calibrated portions of heading and distance signals are used for displaying locations. A magnetic compass is provided including a North-seeking spherical surface carrying a reflective segment, the position of which is sensed by electro-optical components which derive and generate an appropriate heading signal. An odometer generates distance signals which are integrated with the heading signals, calibrated by gating with a probabilistic function. A visual display is driven by means which are responsive to coincidence of the odometer and heading signals but which exclude response to coincidence of an odometer signal and two heading signals.

15 Claims, 8 Drawing Figures

ODOGRAPH AND HEADING INDICATOR THEREFOR

FIELD OF THE INVENTION

The field of art to which the invention pertains includes the field of course indicators, and more particularly the field of odographs.

BACKGROUND AND SUMMARY OF THE INVENTION

The art has long recognized the need for a reliable and accurate system for measuring and displaying the location of a vehicle. Such a system would be of obvious and great value to the military, to police departments, to taxi and other transit services, and to many fleet owners and an inexpensive system would be of great value to the general driving public. A number of systems have been proposed which can be categorized as being proximity, triangulation or dead-reckoning systems. Proximity systems require a network of route markers, e.g., "signpost" transmitters, require a large amount of community commitment and support and cannot be readily unilaterally undertaken by private firms or individuals. Triangulation systems also require community cooperation for locating and maintaining broadcasting stations, and further require sophisticated on-board telemetering equipment.

Dead-reckoning systems have the advantage of being self-generating but also have drawbacks. Errors which occur with a dead-reckoning system can accumulate if the system is not periodically updated and prior dead-reckoning systems based on the use of compasses have usually preferred the use of expensive and intricate gyrocompasses so as to limit the magnitude of errors. Other dead-reckoning systems have been proposed in which differential wheel displacement is used to calculate heading information, but side winds can affect the apparent direction of travel, a problem not suffered by compasses. On balance, the art has not encouraged the use of dead-reckoning systems.

The present invention provides a dead-reckoning system which is reliable and accurate and yet inexpensive. Specifically, an odograph is provided which integrates distance-traveled signals with heading signals to generate location information which can be displayed or otherwise used to pinpoint the location of a vehicle. In one embodiment of the invention, the accuracy of distance-traveled information is made more accurate by probabilistic proportioning of the signals to obtain a correspondence of indicated distance to actual distance. In another embodiment, a unique heading indicator assembly is provided which incorporates a spherical magnetic compass element and electro-optical sensing components which cooperate therewith to generate accurate and reliable heading information, yet in a manner that requires only relatively inexpensive components, permitting utilization of the system by the general public.

More specifically, a magnetic spherical compass element is provided with reflective markings, and means are provided for directing light beams onto the spherical surface. The light beams pass through lenses which rotate along vertically directed paths respective the surface of the compass element. The reflective markings are proportional in length, at least approximately, to the positive cosine of azimuthal angle from a predetermined heading such as North, so that the extent of coincidence of the light beam therewith is indicative of departure from such predetermined heading. By providing for lenses rotating in quadrantal array respective the compass element surface, with appropriate electro-optical sensors, four subsystems are obtained, one each for East, West, North and South.

In particular embodiments, the light beams are formed from a lamp filament light source and are reflected from ellipsoidal mirrors onto the spherical surface, coincident beams being reflected back via the ellipsoidal mirrors and via appropriately dipsosed beam splitting mirrors, onto optical sensors.

Prior art of interest respective the present development includes:

U.S. Pat. No. 2,364,908 to L. C. Miller
U.S. Pat. No. 2,533,024 to A. G. McNish et al
U.S. Pat. No. 3,480,788 to J. B. Barbieri et al
"Speeding the Deployment of Emergency Vehicles", by S. Riter, W. B. Jones, Jr. and H. Dozier, IEEE Spectrum, December 1973, pages 56-62.
"Vehicle Navigation — The State of the Art" by F. D. Collen, British Communications and Electronics, August 1965, pages 486-489.
"Land-Vehicle Navigation System" by S. G. Spracklan, Industrial Electronics, February 1965, pages 72-76.
"VEPOL — A Vehicular Planimetric Dead-Reckoning Computer", by J. H. Myer, IEEE Transactions on Vehicular Technology, Vol. 20, No. 2, August 1971, pages 62-68.
"Letter to Forum" by W. C. Scales, IEEE Spectrum, March 1974, page, 30.
"The Feasibility of Applying the Active TvTime Systems to Automatic Vehicle Location" by D. A. Howe, Navigation: Journal of the Institute of Navigation, Vol. 21, No. 1, Spring 1974, pages 9-15.
"Improved Position Locator (IPL) A Man Carried Land Navigation System", by W. J. Hoff, Navigation: Journal of the Institute of Navigation, Vol. 18, No. 2, Summer 1971, pages 247-252.
"An Electronic Route-Guidance System for Highway Vehicles", by D. A. Rosen et al, IEEE Transactions on Vehicular Technology, Vol. VT-19, No. 1, February 1970.

BRIEF DESCRIPTION OF THE DRAWINGS

FIGS. 4A, B and C are diagrammatic representations of various views of a spherical compass element utilized herein, illustrating the location of a reflective segment thereon and the paths of rotation of the lenses above-referred-to;

DETAILED DESCRIPTION

The following will present a detailed description of components constituting a preferred embodiment of the present invention, but the components described are intended only to illustrate the principles involved and not to limit the invention to the specific relationship and functions set forth. Numerous alternatives can be utilized, as will be referred to subsequently. For convenience of explanation, reference will be made to motion of the compass element relative to the stationary disposition of the other components of the system. However, it will be appreciated that it is, in fact, such other components which rotate respective a rotatably stationary compass element, albeit all components move along the direction of movement of the vehicle.

Figure 1:
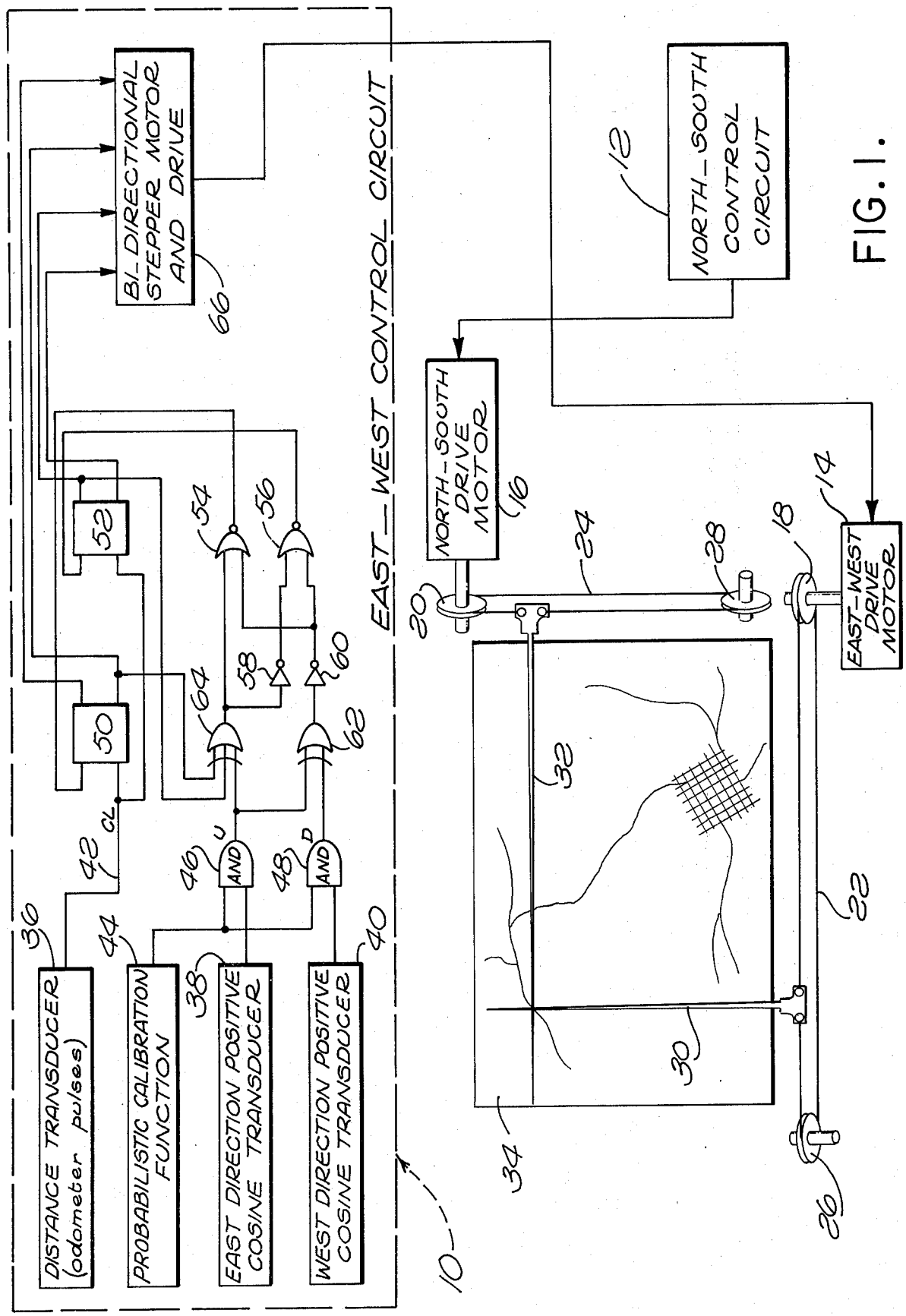
FIG. 1 is a schematic representation of the present odograph including details of the East-West control circuit.

Referring to FIG. 1, an odograph of the present invention is illustrated providing a navigation system for a land vehicle. The system consists of an East-West control circuit 10 and a North-South control circuit 12 connected to stepper motors 14 and 16, respectively. The stepper motors 14 and 16 are connected to drive pulleys 18 and 20, respectively, which are, in turn, disposed in respective operative connection with belts 22 and 24, idler pulleys 26 and 28 and pointers 30 and 32, illustrated schematically in FIG. 1. A map 34 is associated with the pointers 30 and 32 so that clockwise and counterclockwise rotation of the stepper motors 14 and 16 pull the pointers 30 and 32, respectively, back and forth over the map 34 to indicate the location of the vehicle. The components are of a size convenient to the disposition of the map 34 in a convenient visual position within the vehicle, such as in a recess in the dashboard, or just therebelow.

Details of the East-West control circuit 10 are given in FIG. 1, whereas the North-South control circuit 12 is indicated simply by a box designation; however, the North-South control circuit 12 contains an assembly of components which is identical to the East-West control circuit but receives the directional signals from North and South direction transducers. It should also be noted that the pulley-pointer system described herein is only one of a number of position indicators that might be used. For example, the stepper motors 14 and 16 could drive the pointers 30 and 32 by means of lead-screws, or the East-West and North-South drives could be mechanically linked together to drive a pointer through two dimensions for certain pictorial map-interpretation purposes. Furthermore, the directional and distance signals generated herein could be applied to drive analog or digital opto-mechanical or electro-optical displays rather than mechanical ones. For example, the signals can be used to direct an indicator-laser beam with a mirror tilted by lead-screw-driven plungers to x-y locations on a map sheet. As another example, the signals can be used to drive numeric light-emitting diodes, instead of stepper-motors, to numerically display the geographic coordinates of the vehicle.

Referring to the East-West control circuit 10 of FIG. 1 in more detail, as representative of both control circuits, the circuit 10 integrates odometer pulses from a distance transducer 36 with direction signals from an East direction transducer 38 and from a West direction transducer 40. The distance transducer provides, in effect, a clock input (CL) 42 to the circuit and is derived by pick off from the speedometer cable. Although not illustrated in the drawing, such pick off can be readily accomplished by a number of methods, one being electro-optical connection, or magnetic connection, to the usual rotating magnetic member driven by the speedometer cable at the rear of the speedometer. Another method would be to arrange a metal contact on the rotating magnetic member connected for breaking and making electrical contact as it rotates. Regardless of the method used, pulses are generated by the distance transducer in proportion to the distance traveled by the vehicle and the pulses are applied as clock input 42 to the integrating circuit.

The direction transducers 38 and 40 are each positive cosine transducers deriving duty-cycle signals as hereinafter described, and applying their signals to the circuit for integration with the odometer pulses. In order to obtain accurate correspondence of the distance signals to actual distances traveled, calibration is provided in the form of a probabilistic function 44 which is AND-gated at 46 and 48 with the direction transducer signals 38 and 40. The probabilistic calibration function 44 can be a rapid square-wave sequence and be implemented with an integrated circuit timer such as a sold under the trademark Ratheon Model 555 or 556 and can be adjusted to appropriate duty cycle to allow only an appropriate fraction of the odometer pulses to be counted on the average. Thus, the duty cycle of the calibration function 44 can be adjusted during vehicle installation of the navigation system to bring the velocity of the East-West display pointer 30 into correspondence with the vehicle's velocity. A similar calibration function and similar transducers are provided for the North-South control circuit. Alternatively, the North-South control circuit can share the distance transducer signals and probabilistic calibration function of the East-West control circuit 10.

The circuit to which the transducer signals are applied is a 2-bit Gray-Code counter circuit and includes two toggle-type flip-flops 50 and 52, two NOR-gates 54 and 56, two invertors 58 and 60 therefor, a 2-input exclusive-OR-gate 62 and a 3-input exclusive-OR-gate 64. The components are connected as shown to drive a bi-directional East-West stepper motor 14 via a circuit 66 therefor in response to coincidence of (a) an odometer pulse from the distance transducer 36, (b) a pulse from the probabilistic calibration function 44 and (c) a pulse from one only of the East and West direction transducers 38 and 40. The Gray-code-counter circuit counts downward pulses or voltage-transitions at its clock input 42 from the odometer distance transducer. The odometer pulse causes the counter to count up if the up input (U) is on, which occurs only if the East direction transducer signal is on. An odometer pulse causes the counter to count down if the down input (D) is on, which occurs only if the West direction transducer signal is on. By use of the exclusiver-OR-gates 62 and 64, if both East and West transducer signals are on, the counter does not count. (As will be seen from the description which follows, it is possible for the East and West transducers to be on simultaneously.) Accordingly, each time the Gray-code-counter is counted up, the bidirectional stepper motor 14 is driven a step in one direction, corresponding to East and is driven in the opposite sense, corresponding to West, each time the counter is driven down. The bidirection stepper motor circuit 66 is a 4-winding circuit which uses all four output signals of the Gray-code counter. Alternatively, a 2-winding stepper motor can be used which requires only single outputs from each of the flip-flops 50 and 52. Suitable 2-winding stepper motors are manufactured by Haydon Switch and Instrument, Inc. of Waterbury, Connecticut.

Figure 2:
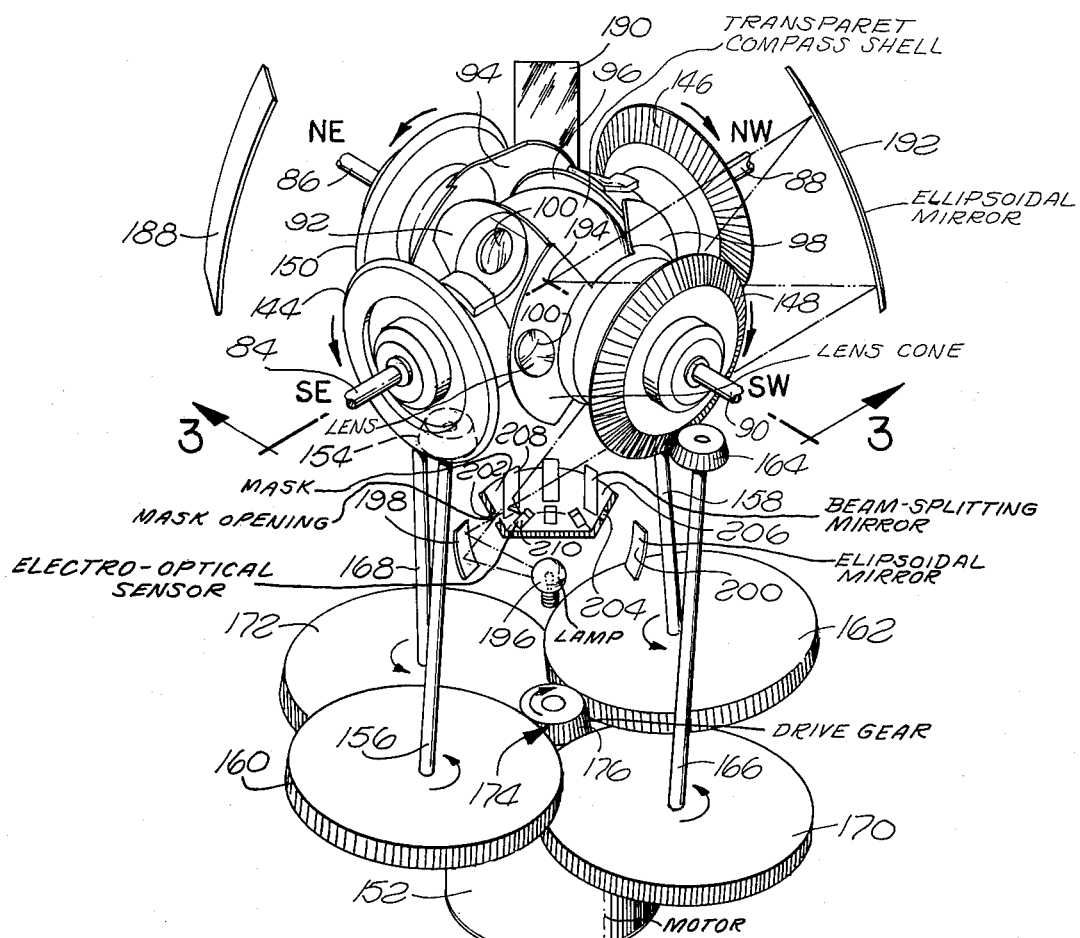
FIG. 2 is a perspective view of operative components of a heading indicator assembly utilized in the present invention.
Figure 3:
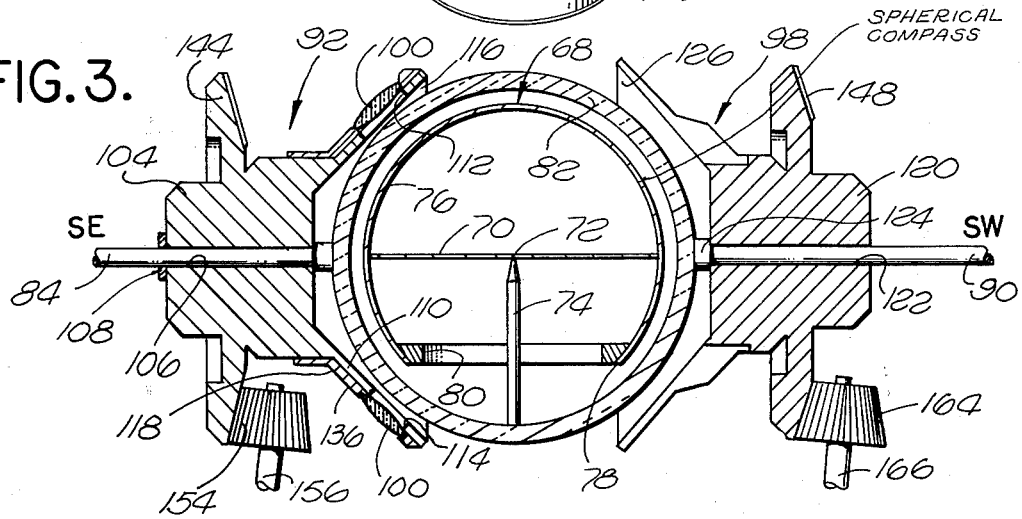
FIG. 3 is a cross-sectional view taken on line 3—3 of FIG. 2, in the direction of the arrows, illustrating a spherical compass element and rotatable lenses therefor.

Referring now to FIGS. 2 and 3, the directional transducer is illustrated and includes a compass 68 and electro-optical components which sense the orientation of the compass 68. The compass 68 includes a magnetic compass element 70 suspended on the pivot point tip 72 of a pin 74. The compass element can contain magnetic and associated members to facilitate balancing on the pin which, for simplicity, are not shown. Surrounding these members and fixed to them is a member 76 having an outer surface conforming to the surface of a sphere with a center at the pivot point 72. The spherical surface member 76 is formed with a large opening 78 to accomodate the pin 74. Additionally, a metal weight ring 80 or the like is secured by adhesive or the like to the inside of the sphere adjacent the opening 78 to facilitate balancing on the pin 74.

Figure 5:
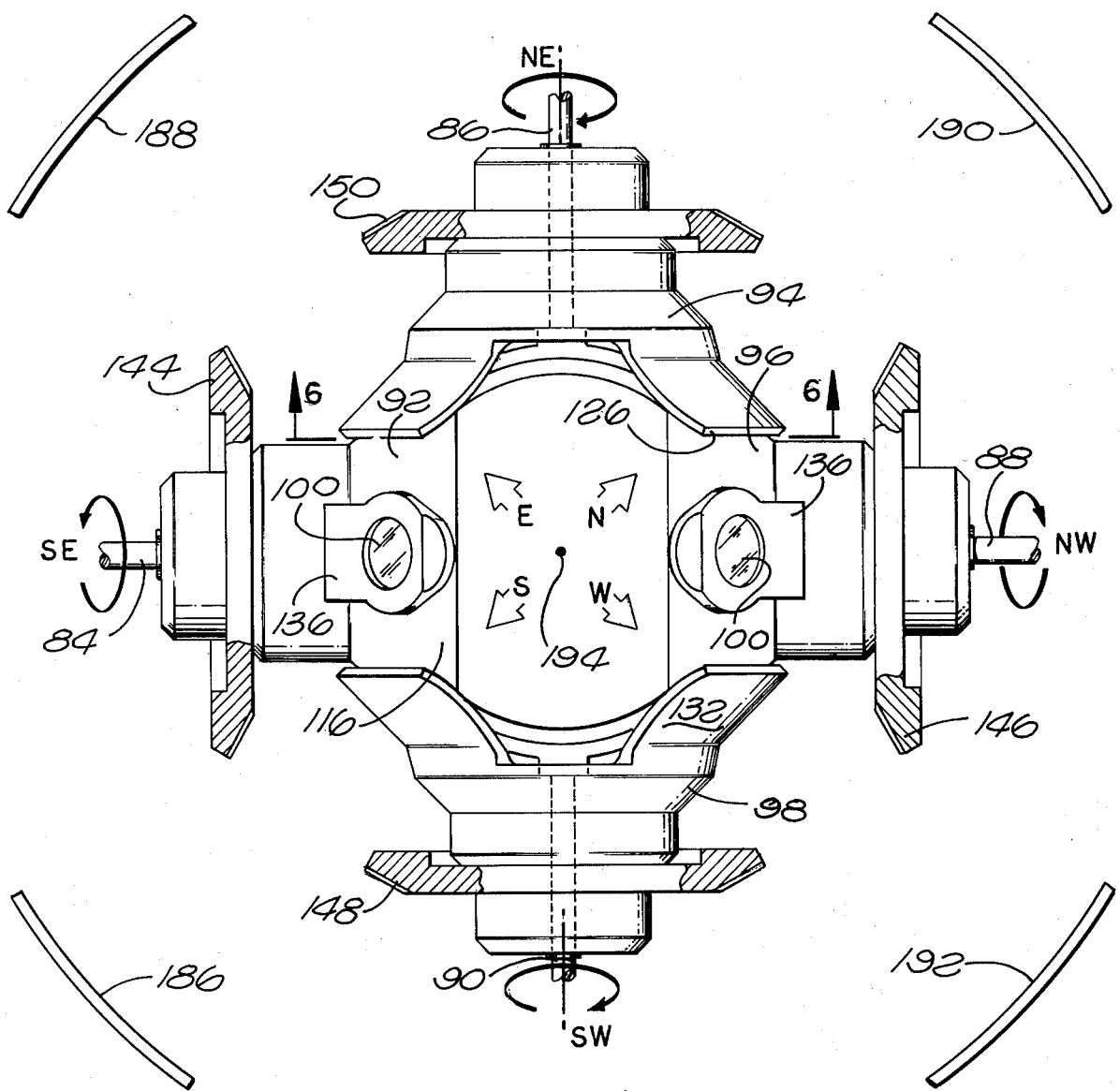
FIG. 5 is a top plan view, partially diagrammatic, of portions of the heading indicator assembly of FIG. 2.

The compass 68 is suspended within a transparent spherical shell 82 by fixing of the base of the pin 74 to the internal base surface of the shell 82. The chamber defined by the shell is filled with a transparent fluid, such as oil, which serves to dampen oscillations of the compass 68. Referring additionally to FIG. 5, the shell 82 is rigidly secured to the vehicle (not shown) by means of rod mounts 84, 86, 88 and 90 projecting from four 90°-spaced locations on the horizontal center section of the sphere. The mounting rods 84, 86, 88 and 90 are positioned in the vehicle so that the North seeking side of the compass 68 is in a desired orientation with respect to the vehicle when the vehicle is in a magnetic North heading. Any orientation can be chosen provided that the orientation is known so that proper heading signals can be derived.

The mounting rods 84, 86, 88 and 90 also serve as axial supports for lens cones 92, 94, 96 and 98, respectively, which cones carry lenses and rotate respective the compass 68 so as to circumscribe segments thereof. In the illustrated embodiment, each cone carries two lenses 100 disposed 180° on the cone surface in openings therefor. The lenses serve to direct light beams onto the surface of the compass 68 and direct reflected light beams back to an electro-optical sensor therefor, as will be described in more detail hereinafter.

Figure 4A:
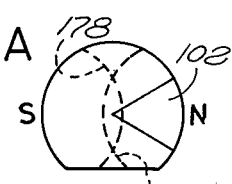
Figure 4B:
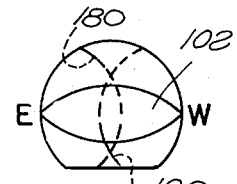
Figure 4C:
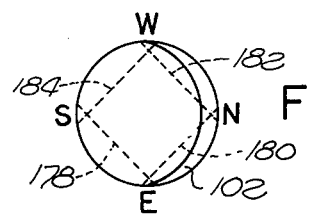

Referring now to FIGS. 4A-C, the outer surface of the compass 68 is coated with reflective markings from which the electro-optical components and associated electronics can discern the element's azimuthal orientation. The reflective markings 102 cover a segment of the spherical compass element and are proportional in height to a function of azimuthal position on the sphere. Advantageously, the reflective marking 102 constitutes, in each azimuthal section, a segment of a vertical circle on the spherical surface of the compass 68 which, along its length, is proportional in height to the positive cosine of the azimuthal angle. The reflective markings 102 can be obtained by applying a metallic coating to the blackened surface of the compass 68. As the compass surface 68 rotates, the heading of the compass can be determined by measuring the extent of light reflected from points which are passed by the reflective marking 102. In other words, means can be provided for focusing a point of light onto the spherical surface and the heading determined by measuring the coincidence of the point with the reflective marking 102. Ideally, the heading respective a particular direction can be obtained by moving a lens along a chord of a vertical circle having a radial center at the pivot point 72, shining light therethrough and monitoring reflected light. The resultant duty cycle will generate a signal that can be used to indicate that directional heading. A similr lens can be rotated along the chord of a vertical circle having an azimuthal displacement 180° from the first lens to provide, for example, North and South subsystems. To provide East and West subsystems, a separate compass can be utilized or multiple sets of lenses for the East-West and North-South vertical circles can be provided all circling the same compass and moved in a manner that the lenses do not interfere with each other, i.e., lends for the East-West vertical circles must pass by the nadir and zenith points alternately with the lenses for the North-South vertical circle.

A practical alternative for use with a single compass element is illustrated in FIGS. 2, 3, 5 and 6 and provides lens motion which approximates movement along two vertical circles. Lenses 100 are attached to the four lens cones 92, 94, 96 and 98 which rotate about axes defined by the mounting rods 84, 86, 88 and 90, respectively, and which can be designated as SE, NE, NW and SW axes, respectively. This designation corresponds to compass rotations relative to the vehicle.

A cross-sectional view of two types of cones utilized herein is shown in FIG. 3. One of the cones 92 is representative of the SE and NW cones while the other cone 98 is representative of the SW and NE cones. The SE cone 92 includes a solid body 102 formed with an axial opening 106 and is journaled for rotation on the mounting rod 84, kept in place by a close fitting elastic washer 108. The body 104 flares out to form a cone-shaped skirt 110. The skirt 110 includes a pair of lens openings 112 and 114 on opposite sides thereof in which are disposed the lenses 100. The material constituting the skirt is formed so as to be substantially flat at the inner surface 116 thereof facing the shell 82 and the lenses 100 are carried protruding somewhat from the rear surface 118 of the cone skirt.

Figure 6:
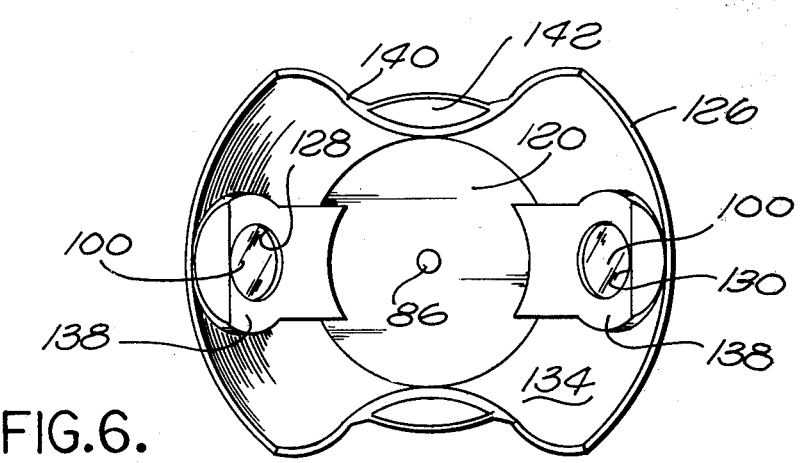
FIG. 6 is a view of a lens support cone taken on line 6—6 of FIG. 5, in the direction of the arrows.

The SW cone 98 is formed with a solid body 120 and is journaled via an axial opening 122 onto the SW mounting rod 90. The cone 98 is retained by means of the drive gear orientation with respect thereto as will be described hereinafter and a flange collar 124 at the base of the mounting rod 90. The SW cone 98 includes a cone-shaped skirt 126 whose configuration is best shown in FIGS. 5 and 6. Referring specifically to those figures, the skirt 126 is formed with a pair of oppositely disposed openings 128 and 130 in which are carried the lenses 100. The material constituting the skirt is formed so as to be substantially flat on its outer surface 132 and the lenses 100 are carried protruding somewhat from the inner surface 134 of the cone skirt 126, so as to be the same radial distance from the pin point 72 as are the other lenses 100.

Each cone is relieved of material at portions between the lenses 100 so as to accomodate rotation therepast of the lenses carried by the other cones. Around each lens, the material of the skirt is built up so as to form lens frames. As shown in FIGS. 3 and 5, the cone skirts of the SE and NW cones 92 and 96, respectively, include frames 136 which are built up on the outer surface of the skirt to secure the lens 100. As shown in FIG. 6, the cone skirts of the SW and NE cones 98 and 94, respectively, include frames 138 which are built up on the inner surface of the skirt to secure the lenses 100. To accomodate the passage of the frames 136 or 138, the relieved portions 140 of the adjacent cone includes a hollowed out portion 142, permitting passage thereby of the lens frames.

Referring back specifically to FIGS. 2 and 3, each cone includes a gear surface by which it is driven. The SE and NW cones 92 and 96 are formed with rear flanges in the form of inwardly facing bevel gears 144 and 146, respectively. The SW and NE cones 98 and 94, respectively, are formed with rear flanges in the form of outwardly facing bevel gears 148 and 150, respectively. The gears are mitre bevel gears which coact with axially intersecting drive gear members which in turn are driven by spur gear connection to a central drive motor 152. Thus, the SE and NW bevel gears 144 and 146 are driven by drive gears such as 154 (shown in shadow in FIG. 2) carried by axles 156 and 158 which, in turn, are driven by spur gears 160 nd 162, respectively. The SW and NE bevel gears 148 and 150, respectively, are driven by drive gears such as 164 carried by axles 166 and 168 which, in turn, are driven by spur gears 170 and 172, respectively. The spur gears 160, 162, 170, 172 are driven by a single spur gear 174 in turn powered by the motor 152. The motor driven spur gear 174 includes an outwardly flared upper peripheral portion 176 and a lower inwardly flared portion (not clearly visible). The upper portion 176 engages the SE and NW spur gears 160 and 162 pitching the axles 156 and 158 inwardly whereas the lower peripheral portion of the motor driven gear 174 engages the SW and NE spur gears 170 and 172 to pitch the axles 166 and 168 outwardly. Accordingly, rotation of the motor driven gear 174 in a clockwise direction results in a clockwise rotation of the SW and NW cones 98 and 96 and counterclockwise rotation of the SE and NE cones 92 and 94, as viewed from the perspective of FIG. 2.

The paths of travel of the lenses carried by the cones 92, 94, 96, 98 are shown in FIGS. 4A, 4B, and 4C. Assuming that the vehicle is in a magnetic North heading, in FIG. 4A the paths of travel of the lenses 100 carried by the SW and NW cones 98 and 96 are indicated by the dashed lines 178 and 180, respectively, in relation to a compass element with a reflective segment 102 on its North-seeking side. In FIG. 4B there are indicated by the dashed lines 180 and 182 the paths of travel of lenses carried by the NW and NE cones 96 and 94, respectively. In FIG. 4C, a top plan view is provided wherein the previously mentioned paths of travel of the cones 98, 96 and 94 are indicated by the dashed lines 178, 180 and 182, respectively and additionally the path of travel of the SE cone 92 is indicated by the dashed line 184. The sides of the compass element are labeled with the geographic directions they normally face.

Inspection reveals that each lens crosses the plane of the four axes at a slightly different azimuth from that of the corresponding vertical circle through the axis and such crossovers constitute an acceptable approximation of motion along two vertical circles and represents a practical adaptation of the ideal configuration to the use of a single compass element. To minimize errors, lens paths should intersect at points above and below the plane of the four axes, as shown in the drawing. Since the lenses are designed to cross over the horizontal mid-plane of the compass sphere at points slightly away from the N-S and E-W axes, it is possible for the East and West sensors to generate simultaneous signals. As indicated above with respect to the circuit of FIG. 1, if both light-sensor signals are on, the counter does not count; i.e., the counter is designed so that simultaneous up and down inputs cause no net count. This circuit design feature corrects for the slight computational error introduced by the fact that the lenses travel in paths which only approximate vertical circles.

Referring again in more detail to FIG. 2, together with FIG. 5, the assembly includes four ellipsoidal mirrors 186 (shown only in FIG. 5), 188, 190 and 192 which are disposed in quadrature array around the assembly between the cones so as to align with the approximately vertical circles defined by the lenses carried by the cone skirts. The ellipsoidal mirrors 186, 188, 190 and 192 are rigidly supported by the vehicle (by means not shown) and positioned so thaat one of the foci of each mirror is located as the radial center of the spherical compass element 68, as indicated at 194. A small source of light in the form of an incandescent lamp bulb 196 is supported and actuated (by means not shown) at a position below the compass sphere and cone assembly. Four small ellipsoidal mirrors, of which two mirrors 198 and 200 are shown, are arranged in quadrature array around the light bulb 196 to direct light therefrom onto openings, such as at 202 and 204, respectively, formed in a conical mask 206. The positions of the first mentioned ellipsoidal mirrors 186, 188, 190 and 192 are such that the second focus of each mirror is located at the corresponding mask opening. Light from the bulk 196 is reflected from the ellipsoidal mirror 198 to focus at the openings such as 202 nd 204 and from there the light beam travels to the large ellipsoidal mirrors 186 and 188, 190 and 192 for reflection therefrom onto the surface of the spherial compass 68, via the lenses 100. If the beam encounters a portion of the reflective segment 102 it is reflected back through the appropriate lens 100.

The mask 206 is part of an assembly which carries beam splitting mirrors such as indicated at 208, between the large ellipsoidal mirrors and mask opening 202. Light traveling from a large ellipsoidal mirror is reflected onto an electro-optical sensor such as indicated at 210 which is connected electrically (by means not shown) to generate a duty cycle signal for the circuit of FIG. 1, proportional to the signal heading.

As exemplary of operation, a light beam travels from the bulb 196 onto the small ellipsoidal mirror 198 from which it is reflected and focused at the mask opening 202 emerging therefrom and impinging upon the surface of the large ellipsoidal mirror 192 from which it is reflected and focused by a passing lens 100 onto the surface of the spherical compass element 68. If the focused light beam coincides with a portion of the reflective marking 102, it is reflected back through the lens 100 onto the ellipsoidal mirror 192 and back to the beam splitting mirror 208 from which it is reflected onto the electro-optical sensor 210.

It will be appreciated that the support for a number of the elements have not been shown but in fact such elements are rigidly secured to the vehicle. Thus, each of the mounting rods 84, 86, 88 and 90 are rigidly secured at their distal ends to the vehicle in a desired heading. The drive gear axles 156 and 158, 166 and 168 are supported by end-bearings (not shown) fixed to the vehicle. Furthermore, in place of individual ellipsoidal mirrors such as 198 and 200 and 186 and 188, 190 and 192, one can use an appropriately shaped single conical unit. In place of the drive gears and axles, one could use a single rotating gear operating in bevel gear fashion with appropriately shaped cone flanges, or one can utilize a timing belt and gear arrangement. Other modifications are contemplated and the invention is limited only in regard to the scope of the claims appended hereto.

I claim:

1. An odograph, comprising:
   odometer means for generating first electrical signals in accordance with distance traveled by a vehicle;
   a magnetic compass element having a support and a spherical surface pivoted on said support for rotative response to the earth's magnetism, and including a predetermined reflective surface portion having greater light reflectivity than remaining portions of said surface;
   illumination means for directing light rays toward at least a portion of said spherical surface;
   a plurality of lenses for focusing said light rays onto said spherical surface and movable to cause said light rays to simultaneously traverse said spherical surface along a plurality of paths for coincidence with said reflective surface portion;
   means for sensing said coincident light rays and generating a second electrical signal in correspondence thereto;
   means for moving said lens means along a path respective said compass element whereby the extent of said second electrical signal generated as a result of said coincidence corresponds to the heading of said vehicle; and
   position indicator means responsive to coincidence of said first and second electrial signals to indicate the location of said vehicle.

2. The assembly of claim 1 wherein the light reflective portion of said spherical surface comprises a generally equatorial segment thereof and said lens paths comprise at least approximately vertical paths.

3. The assembly of claim 3 wherein said reflective segment is proportional in length, at least approximately, to the positive cosine of azimuthal angle from a predetermined heading.

4. The assembly of claim 2 wherein said lens means comprises eight lenses, said lens moving means being operative for revolving said lenses in quadrantal array respective said spherical surface whereby each lens circumscribes a segment of said spherical surface, the vertical paths of adjacent segments overlapping.

5. The assembly of claim 1 wherein said illumination means comprises a lamp filament as a source of light and an ellipsoidal mirror disposed for reflecting light from said source onto said spherical surface.

6. The assembly of claim 5 wherein said mirror is positioned so that its focii are located at said filament and at the center of said sphere.

7. The assembly of claim 5 including an apertured mask between said filament and said mirror for forming a beam of light.

8. The assembly of claim 5 wherein said light sensing means comprises a photoresponsive electrical sensor, and including a beam splitter between said mirror and light source for reflecting light from said spherical surface to said sensor.

9. The assembly of claim 1 wherein said spherical surface is disposed within a closed transparent shell, said shell containing a transparent fluid for damping movement of said surface.

10. An odograph, comprising:
    means for generating travel signals, comprising:
    a. odometer means for generating odometer signals in accordance with distance traveled by a vehicle, and
    b. heading means for generating heading signals in accordance with the heading of said vehicle during said traveled distance in accordance with a predetermined heading of said vehicle and headings at azimuthal angular intervals therefrom;
    position indicator means responsive to coincidence of said odometer signal and said heading signal to provide location indications of said vehicle; and
    calibration means for adjusting changes in location indications to more accurately correspond with the actual location of the vehicle and operative by applying a part only of the total number of said travel signals to said position indicator means.

11. The odograph of claim 10 including means for limiting operational response of said position indicator means to exclude response to coincidence of an odometer signal and two of said heading signals.

12. The odograph of claim 10 wherein said position indicator means comprises:
    a. reference means for displaying a geographical area,
    b. location means responsive to said travel signals to indicate said vehicle location respective said reference means, and
    c. means for disposing said location means closely adjacent said reference means.

13. The odograph of claim 10 wherein said heading means comprises:
    a magnetic compass element having a support and a spherical surface pivoted on said support for rotative response to the earth's magnetism, and including a predetermined reflective surface portion having greater light reflectivity than remaining portions of said surface;
    illumination means for directing light rays toward at least a portion of said spherical surface;
    lens means for focusing said light rays onto said spherical surface for coincidence with said reflective surface portions;
    means for sensing said coincident light rays and generating said second electrical signals in correspondence thereto; and
    means for moving said lens means along a path respective said compass element to cause said light rays to traverse said compass element whereby the extent of said second electrical signal generated as a result of said coincidence corresponds to the heading of said vehicle.

14. The odograph of claim 13 wherein said lens means comprises a plurality of lenses, said lens moving means being operative for traversing said spherical surface with said lenses along a plurality of paths.

15. The odograph of claim 11 in which said means for limiting operational response of said position indicator means comprises exclusive -OR-gate circuitry.

* * * * *

UNITED STATES PATENT AND TRADEMARK OFFICE
CERTIFICATE OF CORRECTION

PATENT NO. : 4,061,995
DATED : December 6, 1977
INVENTOR(S) : John T. McCrickerd It is certified that error appears in the above-identified patent and that said Letters Patent are hereby corrected as shown below:

Column 6, line 3, "similr" should be --similar--.

Column 6, line 12, "lends" should be --lenses--.

Column 8, line 12, "thaat" should be --that--.

Column 8, line 25, "bulk" should be --bulb--.

Column 8, line 27, "nd" should be --and--.

Column 9, line 28, "electrial" should be --electrical--.

Column 9, line 34, "Claim 3" should be --Claim 2--.

Signed and Sealed this

Twenty-first Day of March 1978

[SEAL]

Attest:

RUTH C. MASON
Attesting Officer

LUTRELLE F. PARKER
Acting Commissioner of Patents and Trademarks